(12) United States Patent
Katsuki

(10) Patent No.: US 6,366,792 B1
(45) Date of Patent: Apr. 2, 2002

(54) RADIO PORTABLE INFORMATION TERMINAL AND RADIO DATA TRANSMITTING RECEIVING SYSTEM

(75) Inventor: Masahiro Katsuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/296,720

(22) Filed: Apr. 22, 1999

(30) Foreign Application Priority Data

Apr. 24, 1998  (JP) ............................................ 10-131119

(51) Int. Cl.⁷ ................................................ H04M 7/00
(52) U.S. Cl. ...................................... 455/572; 455/557
(58) Field of Search ................................. 455/572, 557

(56) References Cited

U.S. PATENT DOCUMENTS 5,826,198 A   10/1998   Bergins et al.

FOREIGN PATENT DOCUMENTS

WO   WO 94/11999   5/1994

*Primary Examiner*—William Cumming
(74) *Attorney, Agent, or Firm*—Scully, Scott, Murphy & Presser

(57) ABSTRACT

If the radio portable information terminal detects the current battery capacity level and the receiving electrical field level and finds that these levels are sufficient to perform data transmission/reception, the radio portable information terminal formulates a data transmission/reception possible signal to send the data transmission/reception possible signal via a base station to the information network center, which then checks to see that the radio portable information terminal is in the transmission/reception enabling state to perform data transmission/reception with the radio portable information terminal. To provide a system in which, when data transmission/reception is to be carried out between a radio portable information terminal and an information network center, the operation for checking the possible battery-off state or the intensity of the receiving electrical field, so far felt to be necessary, can be eliminated to render it possible to recognize the state of the radio portable information terminal at the information network center side.

6 Claims, 12 Drawing Sheets

FIG. 5

| BATTERY LEVEL | ELECTRICAL FIELD LEVEL | SPEECH COMMUNICATION | RADIO PORTABLE INFORMATION TERMINAL | DATA TRANSMISSION/RECEPTION |
|---|---|---|---|---|
| 5 | 5 | POSSIBLE | POSSIBLE | POSSIBLE FOR PROLONGED TIME |
| 4 | 4 | POSSIBLE | POSSIBLE | POSSIBLE FOR SHORT TIME |
| 3 | 3 | POSSIBLE | POSSIBLE | IMPOSSIBLE |
| 2 | 2 | IMPOSSIBLE | POSSIBLE | IMPOSSIBLE |
| 1 | 1 | IMPOSSIBLE | IMPOSSIBLE | IMPOSSIBLE |

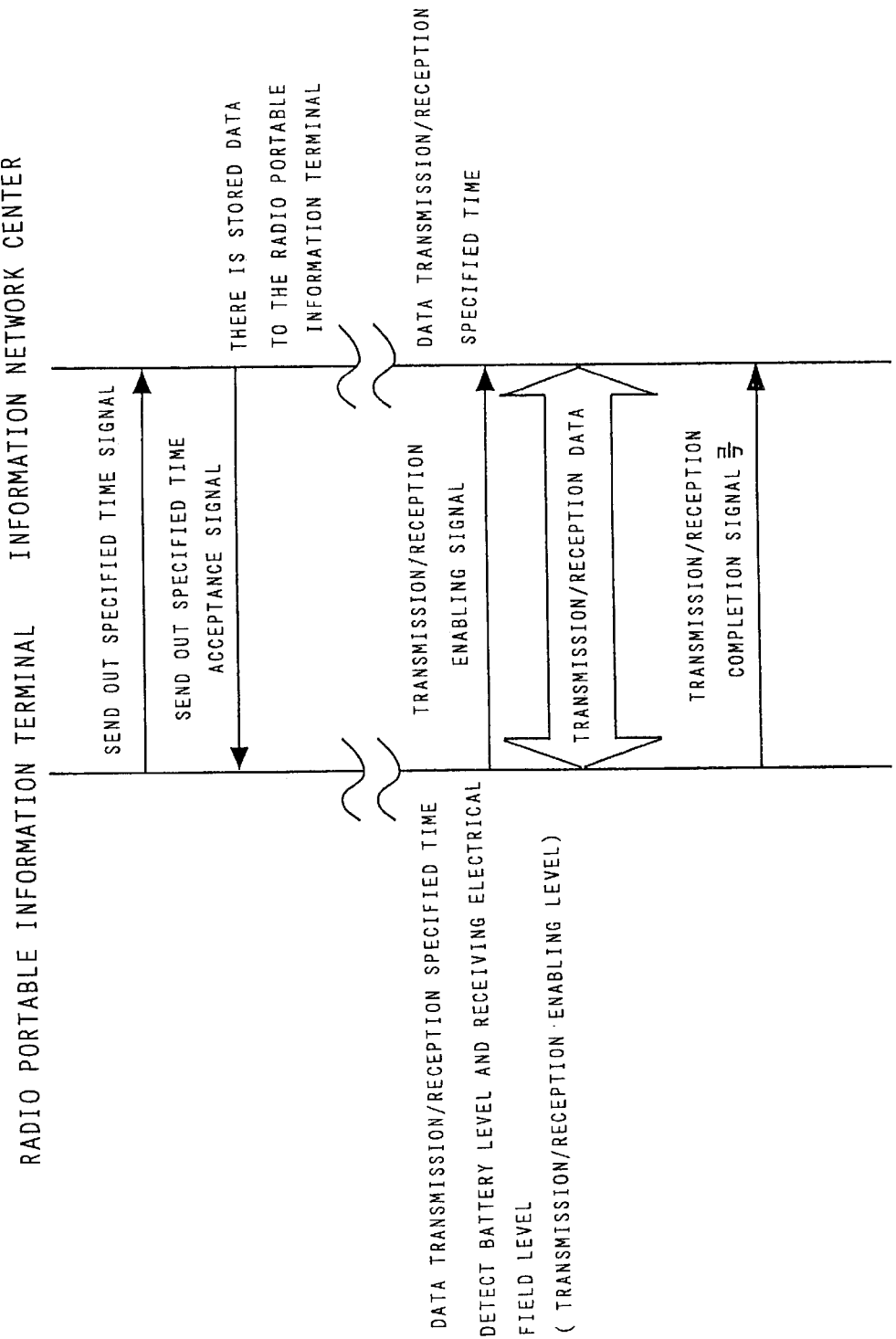

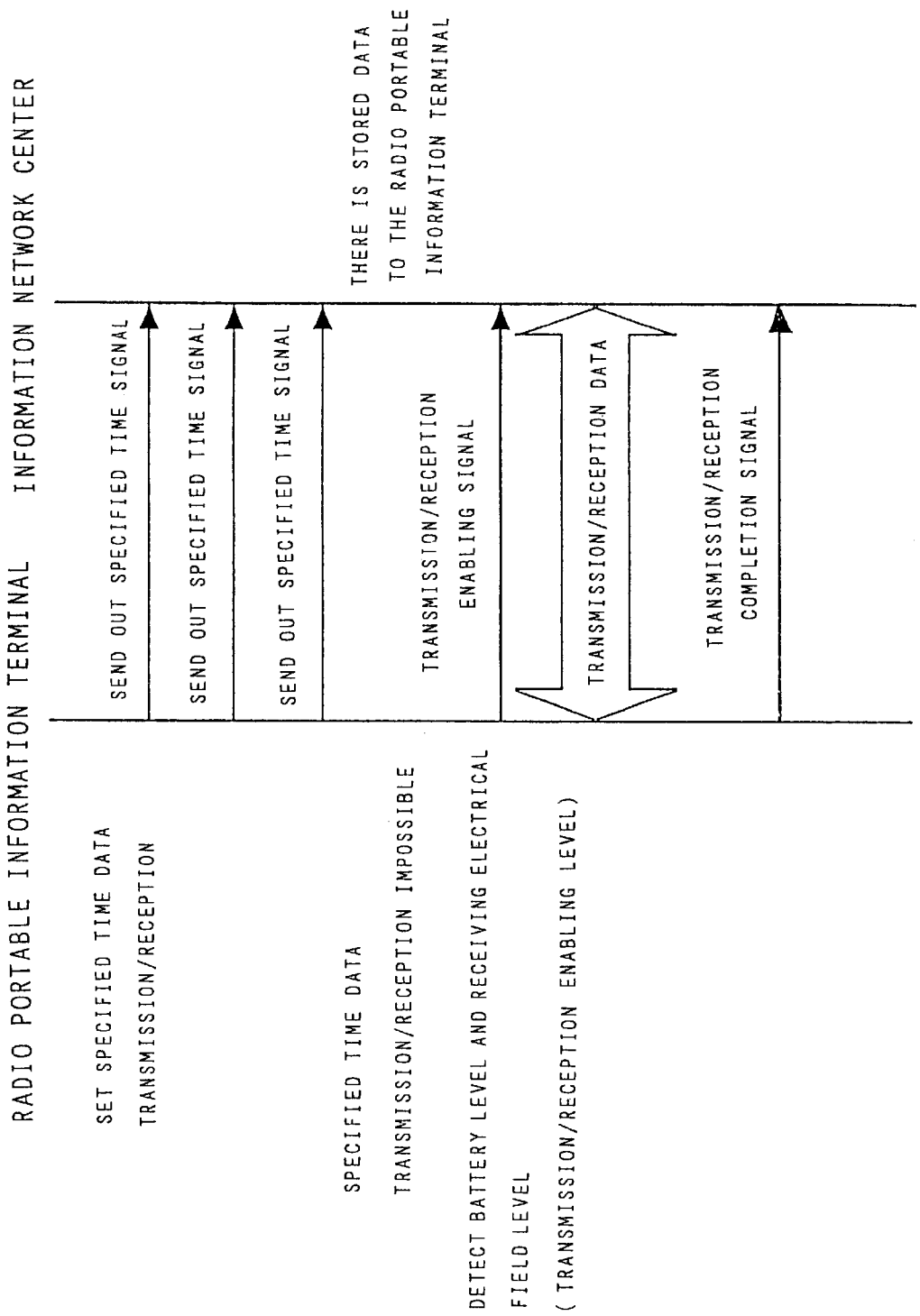

RADIO PORTABLE INFORMATION TERMINAL AND RADIO DATA TRANSMITTING RECEIVING SYSTEM

FIELD OF THE INVENTION

This invention relates to a wireless (termed herein as "radio") portable information terminal transmitting/receiving system. More particularly, it relates to a radio data transmitting/receiving system used with advantage for data transmission/reception between a radio portable information terminal and an information network center.

BACKGROUND OF THE INVENTION

Recently, a portable information terminal device for mobile computing has become popular, while radio portable information terminals, comprised of the portable information terminal device and the wireless (radio) communication function attached to the portable information terminal device, is also used extensively. This radio portable information terminal is connected for communication with the information network center via a radio base station connected to a public network, and includes a WWW (world wide web) server, supervising the WWW information, or an E-mail server, in order to exchange the information with the information network center connected to the Internet (see for example to FIG. 1).

In this case, a user of the radio portable information terminal checks the indication of the residual cell capacity on a display unit of the radio portable information terminal or the state of intensity of the electrical field displayed with an antenna mark to ready for data reception.

If the PUSH type information distribution is to be made from the information network center to the radio portable information terminal, data is distributed to the radio portable information terminal while it is unknown whether or not the radio portable information terminal is ready for reception. If, in such case, the reception is not possible on the side of the radio portable information terminal due to, for example, battery power off, the result is wasteful data re-transmission.

SUMMARY OF THE DISCLOSURE

As discussed above, the conventional radio portable information terminal system has the following inconveniences:

The first problem is that the user has to perform the operation of checking the residual capacity of the battery displayed on a display unit of the radio portable information terminal or the state of the intensity of the electrical field displayed as an antenna mark and of receiving the data from the radio portable information terminal to the information network center, each time the data is received, thus complicating the operation.

The second problem is that, when the PUSH type information distribution is to be made from the information network center to the radio portable information terminal, data distribution is done even though it is not known whether or not the radio portable information terminal is readied for receiving the information, such that, if the battery capacity is short, the electrical field is weak or the terminal is outside the service range and hence the radio portable information terminal cannot receive the information, the result is wasteful data transmission and re-transmission.

The reason is that, when the PUSH type information distributionistobe made from theinformation network center to the radio portable information terminal, the information network center is not provided with functional means adapted for grasping whether or not the radio portable information terminal is in a state readied for reception.

In view of the above-mentioned problems of the prior art, it is an object of the present invention to provide a radio portable information terminal data transmitting system in which there is no necessity of carrying out the operation of confirming the battery capacity/shortage or the intensity of the receiving electrical field, which has so far been felt to be necessary in data communication/reception with the information network center.

It is another object of the present invention to provide a radio portable information terminal system in which the state of the radio portable information terminal can be recognized on the information network center side even when the PUSH type information distribution is to be made from the information network center to the radio portable information terminal.

For accomplishing the above object, the present invention provides a radio data transfer system of a radio portable information terminal wherein, when the radio portable information terminal effects data transmission/reception via a radio base station with an information network center, the radio portable information terminal detects the current battery capacity level and the receiving electrical field level to compare and verify whether or not said levels are sufficient to permit said data transmission/reception; if the current battery capacity level and the receiving electrical field level are on the transmission/reception enabling level, the radio portable information terminal formulates a data transmission/reception enabling signal to send the data transmission/reception enabling signal via the radio base station to the information network center; and wherein the information network center checks to see that the radio portable information terminal is in the transmission/reception enabling state to effect data transmission/reception with the radio portable information terminal.

BRIEF DESCRIPTION OF THE DRAWINGS

FIG. 5 shows an example of the contents of a data transmission/reception enabling detection table in the embodiment of FIG. 1.

FIG. 11 shows a sequence of specified time data transmission/reception in a second embodiment of the present invention.

FIG. 12 shows a sequence of impossible specified time data transmission/reception in the second embodiment of the present invention.

PREFERRED EMBODIMENTS OF THE INVENTION

A preferred embodiment of the present invention is hereinafter explained. When transmitting/receiving radio exchange data to or from a radio portable information terminal or an information network center, a portable information terminal having the wireless communication function (referred to as 'radio portable information terminal') or the radio data transmitting/reception system of a preferred embodiment according to the present invention detects the battery capacity level required by the radio portable information terminal and the electrical filed level which permits the reception to advise the information network center of the possible state of reception of the radio portable information terminal.

This renders it possible to suppress data re-transmission of PUSH type data from the information network center or mail data or data of the world-wide web (WWW) information data having a larger data volume, ascribable to shortage of battery capacity or the worsened reception electrical field state of the radio portable information terminal, during transmission/reception, in order to permit efficient data transmission/reception.

Figure 1:
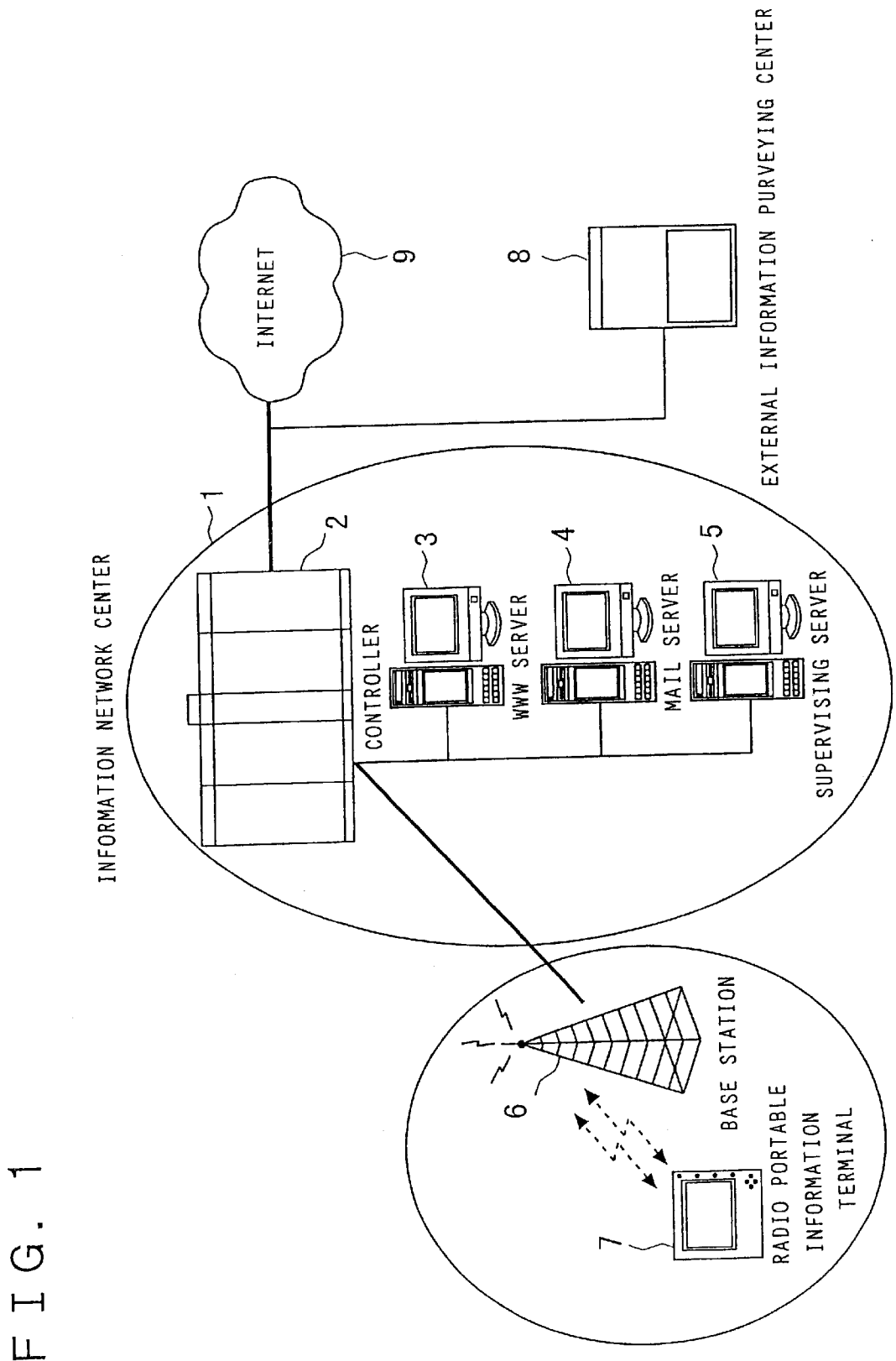
FIG. 1 shows an overall system configuration of an embodiment of the present invention.

Referring to FIG. 1 showing an embodiment of the present invention, an information network center 1 is made up of a WWW server 3 supervising the WWW information, an E-mail server 4 supervising the E-mail data, a supervising server 5 for supervising the state of the radio portable information terminal and a controller 2 for controlling the information network center 1.

The information network center 1 is connected to an external information purveying (supply) center 8 and to the Internet 9.

If, in exchanging data with the information network center 1, in the present embodiment of the present invention, when a radio portable information terminal 7 detects the current battery capacity level and the receiving electrical field level, and verifies that the current battery capacity level and the receiving electrical field level of the radio portable information terminal 7 are at the transmission/reception enabling level, the radio portable information terminal 7 formulates a data transmission/reception possible signal and sends this transmission/reception possible signal to a base station 6. The data transmission/reception possible signal is transmitted via the base station 6 to the information network center 1, while being transmitted via the controller 6 to the supervising server 5.

The WWW server 3 and the mail server 4 verify that the radio portable information terminal 7 which has transmitted the transmission/reception possible signal to the supervising server 5 is in the transmission/reception possible signal state, after which the WWW server 3 transmits the relevant WWW data and mail data to the radio portable information terminal 7.

EXAMPLES

For further illustrating the above-described example of the present invention, preferred examples of the present invention are hereinafter explained with reference to the drawings.

FIG. 1 shows the entire system configuration of a radio data transmission/reception system according to an example of the present invention.

Referring to FIG. 1, an example of the present invention includes a radio portable information terminal 7, as a portable information terminal, having an attached radio function, and a base station-6 for relaying radio data of the radio portable information terminal 7. The information network center 1 includes a WWW server 3 for data transmission/reception with the radio portable information terminal 7, a mail server 4, a supervising server 5 and a controller 2 for supervising the information network center 1. The information network center 1 is connected to an external information purveying center 8 for purveying the information etc. to the radio portable information terminal 7 and to the Internet 9.

If the radio portable information terminal 7 transmits/sends data to or from the information network center 1, the radio portable information terminal 7 detects the battery capacity level and the receiving electrical field level required for data transmission/reception. If the detected battery capacity level and the receiving electrical field level are on a transmission/reception enabling level, the radio portable information terminal 7 formulates a data transmission/reception possible signal to transmit the data transmission/reception possible signal via the base station 6 to theinformation network center 1 and to transmit the data transmission/reception possible signal via the controller 2 to the supervising server 5. The radio portable information terminal 7 also displays the data transmission/reception enabling signal on the display unit.

The WWW server 3 and the mail server 4 of the information network center 1 check the state of the transmission/reception possible signal of the radio portable information terminal stored in the supervising server 5. After verifying that the radio portable information terminal is in the transmission/reception enabling state, the WWW server 3 and the mail server 4 transmit the relevant WWW data and mail data to the radio portable information terminal 7.

On the other hand, if the radio portable information terminal 7 verifies, from the detected battery capacity level and the level of the electrical field intensity level, that data transmission/reception is impossible, the radio portable information terminal 7 formulates the data transmission/reception disabling signal to route the data transmission/reception impossible signal via the base station 6 to the information network center 1. If the battery capacity level is insufficient for data transmission/reception, the battery is electrically charged. If the receiving electrical field intensity level is not suited for data transmission/reception, the radio portable information terminal 7 sends a data transmission/reception impossible signal to the information network center 1 to wait for restoration of the receiving electrical field intensity level. On the other hand, if the receiving electrical field intensity level is in the data transmission/reception enabling state, the radio portable information terminal 7 sends a data transmission/reception possible signal to the information network center 1 to effectuate data transmission/reception between it and the information network center 1.

Figure 2:
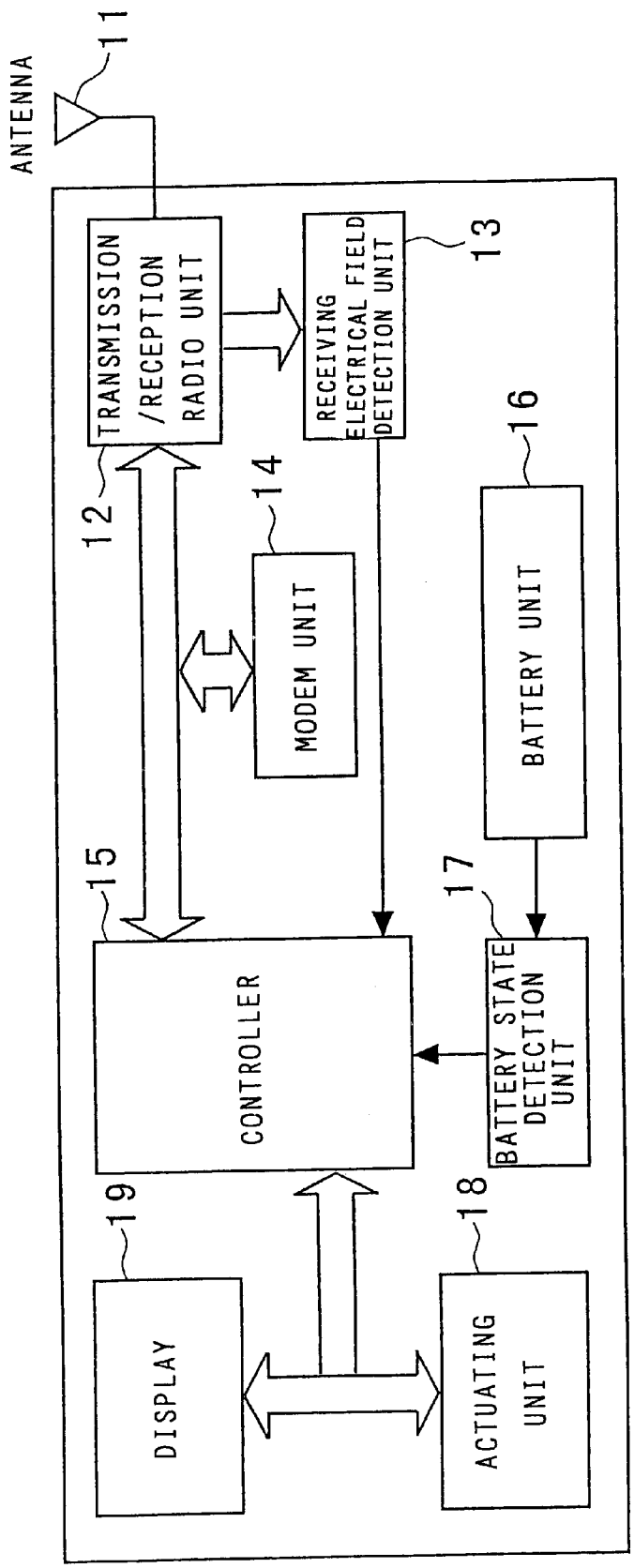
FIG. 2 is a block diagram showing the structure of a radio portable information terminal in the embodiment of FIG. 1.

FIG. 2 shows an illustrative structure of the radio portable information terminal 7 in an example of the present invention.

Referring to FIG. 2, the radio portable information terminal 7 includes a transmission/reception radio unit 12, a detection unit 13 for detecting the intensity of the receiving electrical field from the transmission/reception radio unit 12, a controller 15 for controlling the radio portable information terminal 7 in its entirety, a modem 14 for processing the data formulated by the controller 15 as transmission/reception data, a battery unit 16 for supplying the power source to the radio portable information terminal 7, and a battery state detection unit 17 for detecting the state of the battery. The radio portable information terminal 7 also includes an actuating (input) unit 18 and a display unit 19 for displaying the state of the radio portable information terminal 7 and the transmission/reception data.

Figure 3:
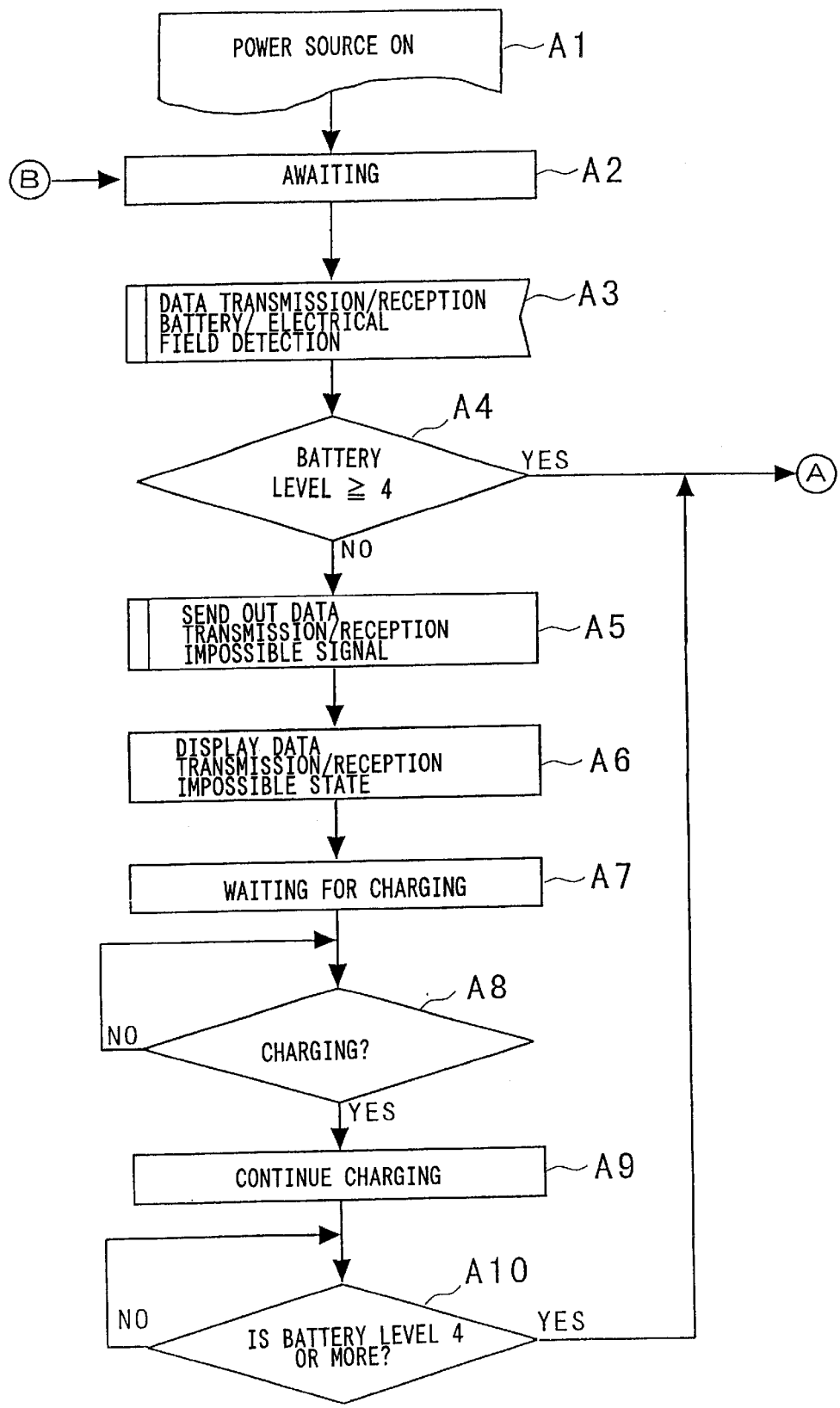
FIG. 3 is a flow diagram showing the processing flow of a radio portable information terminal of the embodiment of FIG. 1.
Figure 4:
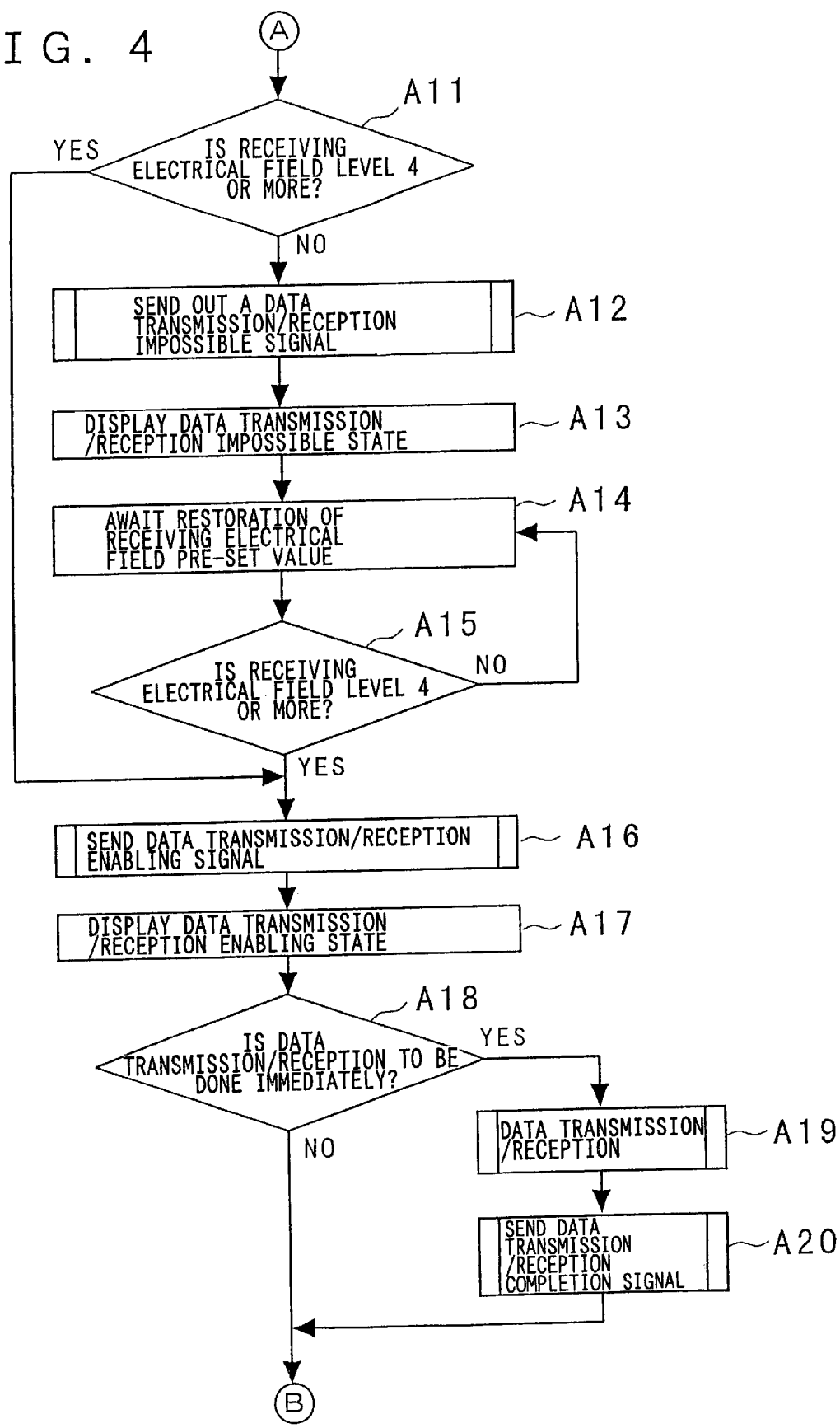
FIG. 4, continuing to FIG. 3, is a flow diagram showing the processing flow of a radio portable information terminal of the embodiment of FIG. 1.

FIGS. 3 and 4 illustrate the processing flow of the above-described example of the present invention. Referring to FIGS. 1 to 4, the operation of the above-described example is now explained.

The power source of the radio portable information terminal 7 is turned on by the actuating unit 18 (step A1 for measuring characteristics of an optical pickup of FIG. 3).

The radio portable information terminal 7 entered a waiting state (step A2 of FIG. 3). The radio portable information terminal 7 then detects whether or not data transmission/reception is possible (step A3 of FIG. 3).

First, the controller 15 captures the current battery capacity level from the battery state detection unit 17 and compares the captured battery capacity level to a data transmission/reception enabling detection table (see FIG. 5) to verify whether or not the battery level is not less than 4 (step A4 in FIG. 3).

FIG. 5 shows an example of the contents of the data transmission/reception enabling detection table in the preferred example of the present invention.

Referring to FIG. 5, the data transmission/reception enabling detection table is a table which tabulates the battery level values, the electrical field level values, possibility of voice communication, usable state of the portable information terminal and possibility of data transmission/reception, and which is stored in a memory portion, not shown, of the controller of the radio portable information terminal 7. The battery level of the battery unit 16 and the electrical field level are detected by the battery state detection unit 17 and by a receiving electrical field detection unit 13, respectively, and are routed to the controller 15.

In the example of the data transmission/reception enabling detection table, data transmission/reception is 'impossible' for the battery level '3' or less, while being 'possible if for shorter time' and 'possible for prolonged time' for the battery levels '4' and '5', respectively. If the electrical field level is '4', data transmission/reception is 'possible for short time', whereas, if the electrical field level is '5', data transmission/reception is 'possible for prolonged time'.

Referring again to FIG. 3, if the battery level, as found at step A4, is 4 or above, processing transfers to the receiving electrical field detection processing at step A11 of FIG. 4.

If the battery level as found at step A4 is 3 or less, the controller 15 formulates data transmission/reception impossible signal data to route the data transmission/reception impossible signal data via modem unit 14, transmission/reception radio unit 12 and antenna 11 to route a data transmission/reception impossible signal via base station 6 to the supervising server 5 of the information network center 1.

The data. transmission/reception impossible state is displayed on the display unit 19 (step A6 of FIG. 3).

The state is now that for waiting for the battery charging (step A7 of FIG. 3). If the battery is being charged, the charging is continued (step A8 and step A9 of FIG. 3). If the battery level is '4' or more (YES branch to step A9 of FIG. 3), processing transfers to the processing of detecting the receiving electrical field level at step A11.

The controller 15 then detects the current receiving electrical field level, captured from the receiving electrical field detection unit 13, compares the field level to the data transmission/reception enabling detection table for collation, to verify whether or not the receiving electrical field level is not less than '4' (step A11 of FIG. 4).

If, at the decision of step A11, the receiving electrical field level is '3' or less, the controller 15 formulates the data transmission/reception impossible signal data in the controller 15. The data transmission/reception impossible signal data, thus formulated, is sent via base station 6 to the supervising server 5 of the information network center 1 (step A12 of FIG. 4).

The data transmission impossible state is displayed on the display unit 19 (step A13 of FIG. 4). Then, level restoration is awaited until the receiving electrical field level reaches '4' or more (steps 14, 15 of FIG. 4).

If the battery level is 4 or more and the receiving electrical field level is 4 or more, the controller 15 causes data transmission/reception possible signal data to be formulated and transmitted via modem unit 14, transmission/reception radio unit 12 and antenna 11. The transmitted data transmission/reception possible signal is sent via the base station 6 to the supervising server 5 of the information network center 1 (step A16 of FIG. 4).

The data transmission possible state is displayed on the display unit 19 (step A17 of FIG. 4).

The controller 15 then verifies whether or not data transmission/reception is to be made immediately (step A18 of FIG. 4).

If it is decided at step A18 of FIG. 4 that data transmission/reception is not to be done immediately, the controller reverts to the awaiting state of step A2. If data transmission/reception is to be done immediately, data transmission/reception is carried out between the radio portable information terminal 7 and the information network center 1 (step A19 of FIG. 4).

When data transmission/reception comes to a close, the data transmission/reception compete signal is routed from the radio portable information terminal 7 to the supervising server 5 of the information network center 1 (step A20 of FIG. 4) to revert to the awaiting state of step A2 in FIG. 3.

Figure 6:
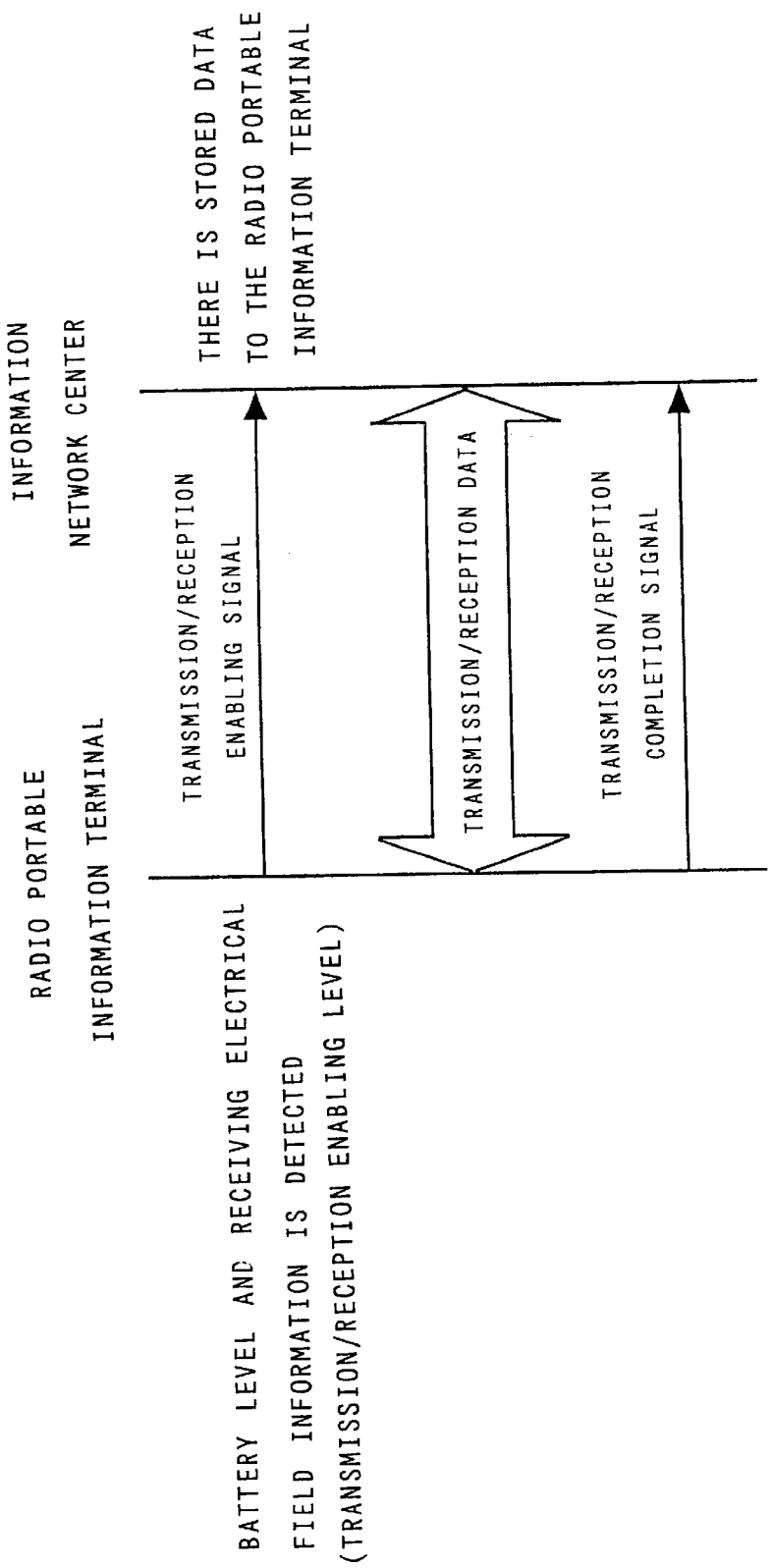
FIG. 6 shows the transmission/reception sequence of the embodiment of FIG. 1.

FIG. 6 shows the operating sequence of the example of the present invention and specifically the transmission/reception possible sequence of a data transmission/reception system in case the data transmission/reception possible signal is transmitted between the radio portable information terminal 7 and the information network center 1.

Referring to FIG. 6, if the battery level and the receiving electrical field level is detected and found to be on the transmission/reception enabling level, the transmission/reception enabling signal is transmitted via the base station to the information network center 1 to transfer the transmission/reception data between the information network center 1 and the radio portable information terminal 7. After the end of transmission/reception, the transmission/reception completion signal is sent from the radio portable information terminal 7 to the information network center 1.

Figure 7:
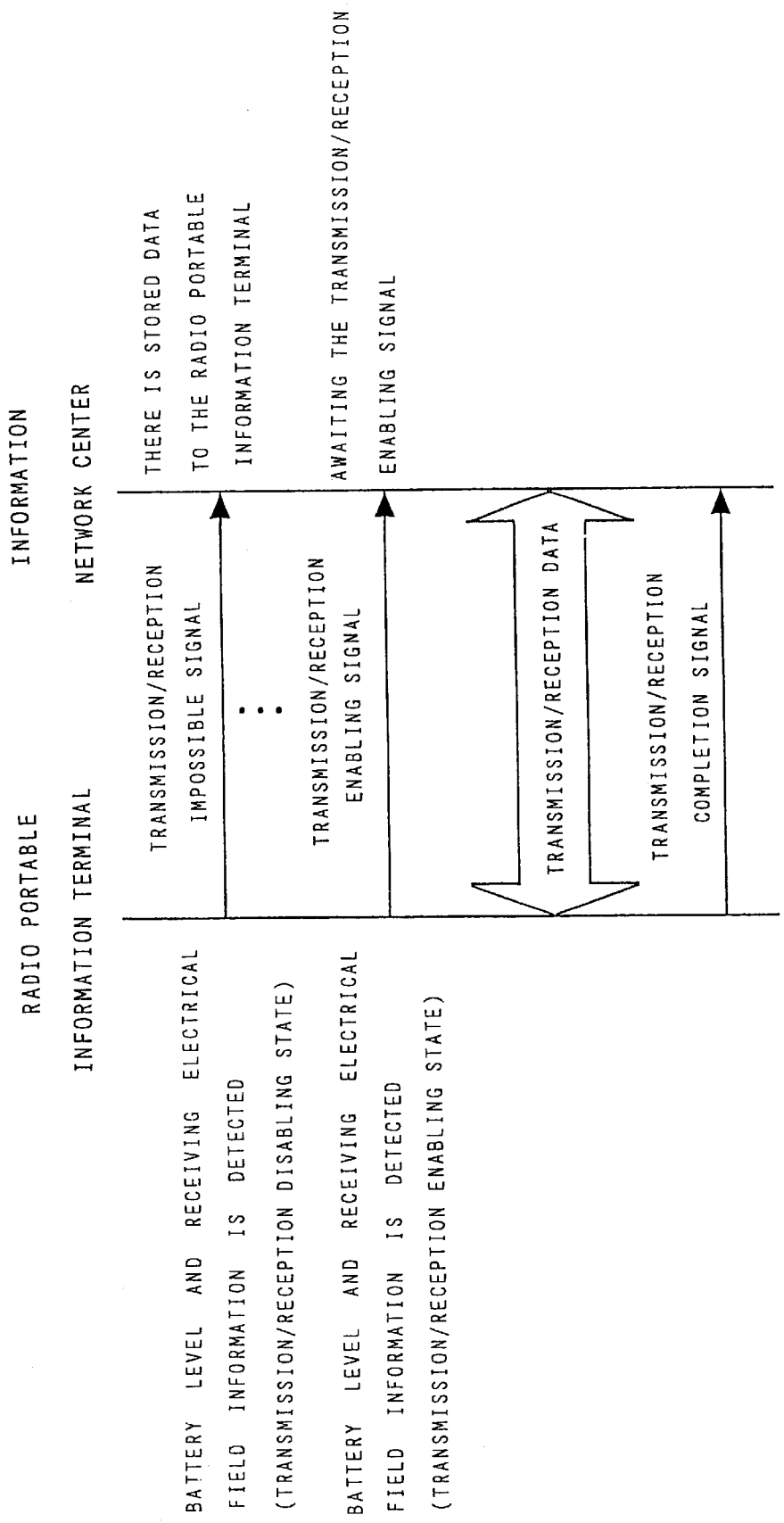
FIG. 7 shows the transmission/reception impossible/possible sequence in the embodiment of FIG. 1.

FIG. 7 shows the operating sequence of an example of the present invention, more specifically, the transmission/reception impossible/possible sequence of the data transmission/reception system after a data transmission/reception possible signal is transmitted after a data transmission/reception impossible signal has, been sent out between the radio portable information terminal 7 and the information network center 1.

Referring to FIG. 7, if the radio portable information terminal 7 detects the battery level and the receiving electrical field level, and finds that the transmission/reception is not possible, the transmission/reception impossible signal is transmitted via the base station 6 to the information network center 1 and, if there is accumulated data in the information network center 1 which is to be transmitted to the radio portable information terminal 7, the oncoming from the radio portable information terminal 7 of the transmission/reception enabling signal is awaited. If the radio portable information terminal 7 detects the battery level and the receiving electrical field level, and finds that the transmission/reception is possible, the transmission/reception possible signal is transmitted via the base station 6 to the information network center 1 to transfer the transmission/reception data between the information network center 1 and the radio portable information terminal 7. After the end of transmission/reception, the transmission/reception completion signal is routed from the radio portable information terminal 7 to the information network center 1.

Figure 8:
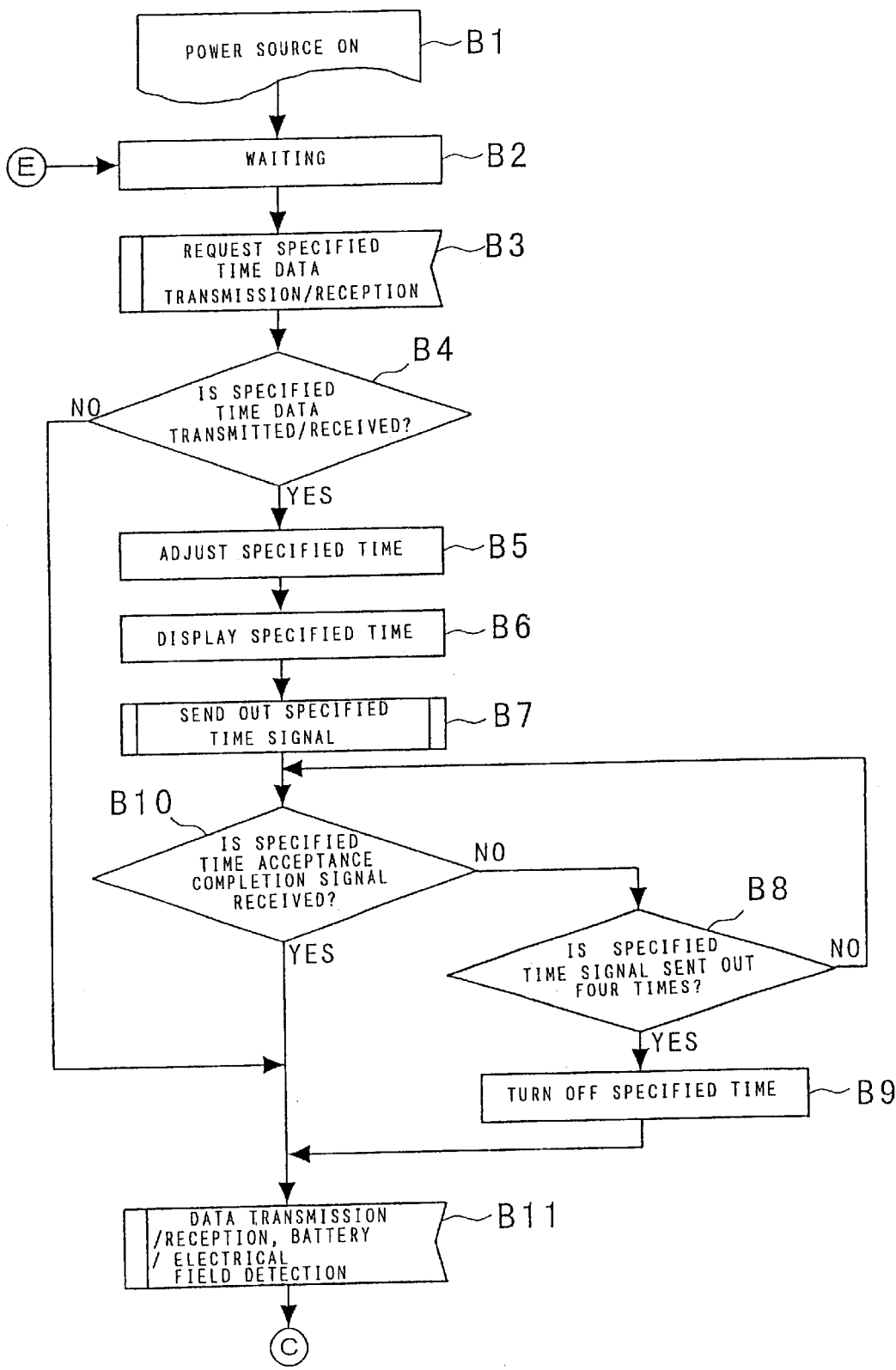
FIG. 8 is a flow diagram showing the processing flow of a radio portable information terminal of a second embodiment of FIG. 1.
Figure 9:
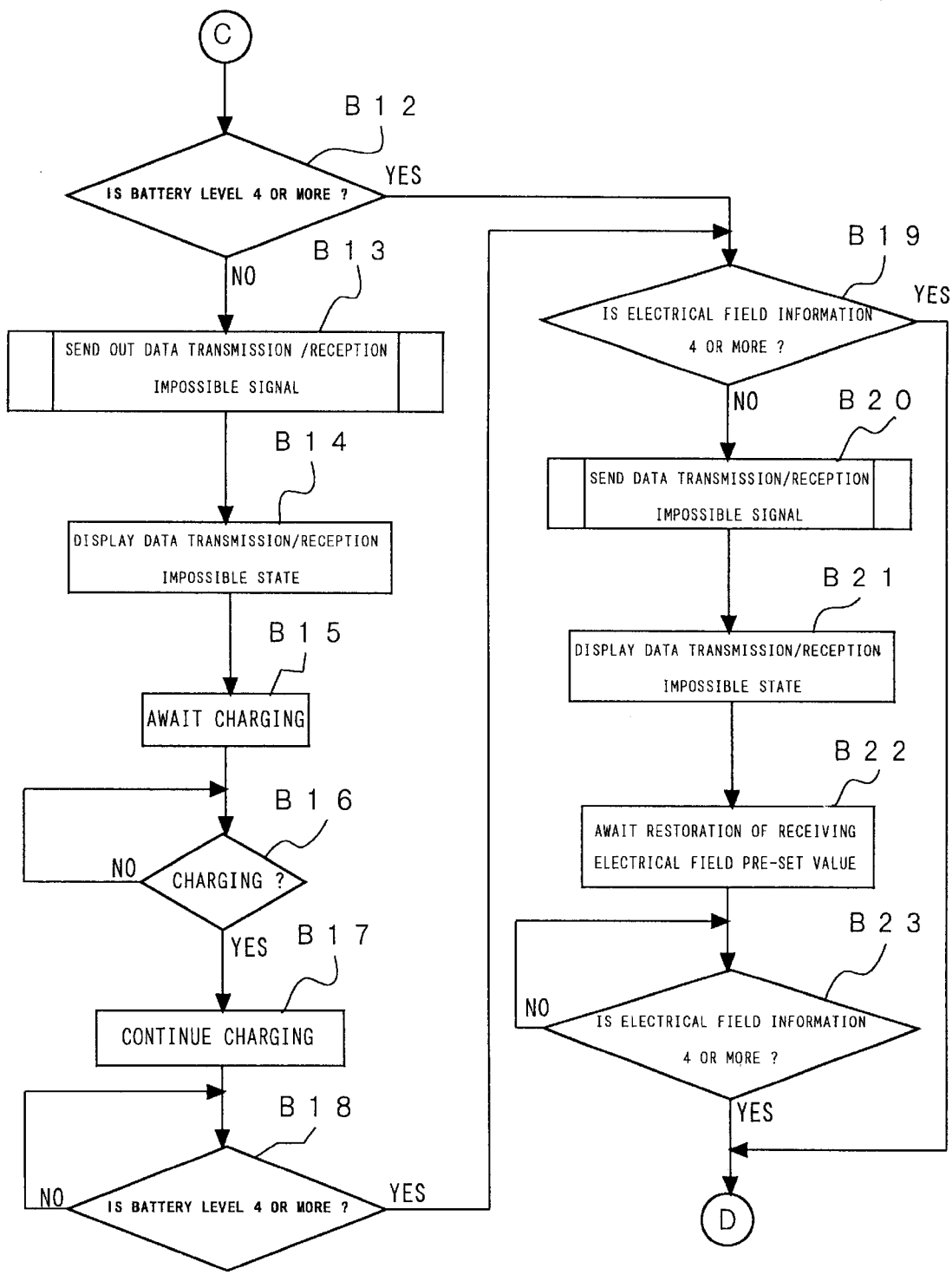
FIG. 9, continuing to FIG. 8, is a flow diagram showing the processing flow of a radio portable information terminal of the embodiment of FIG. 8.
Figure 10:
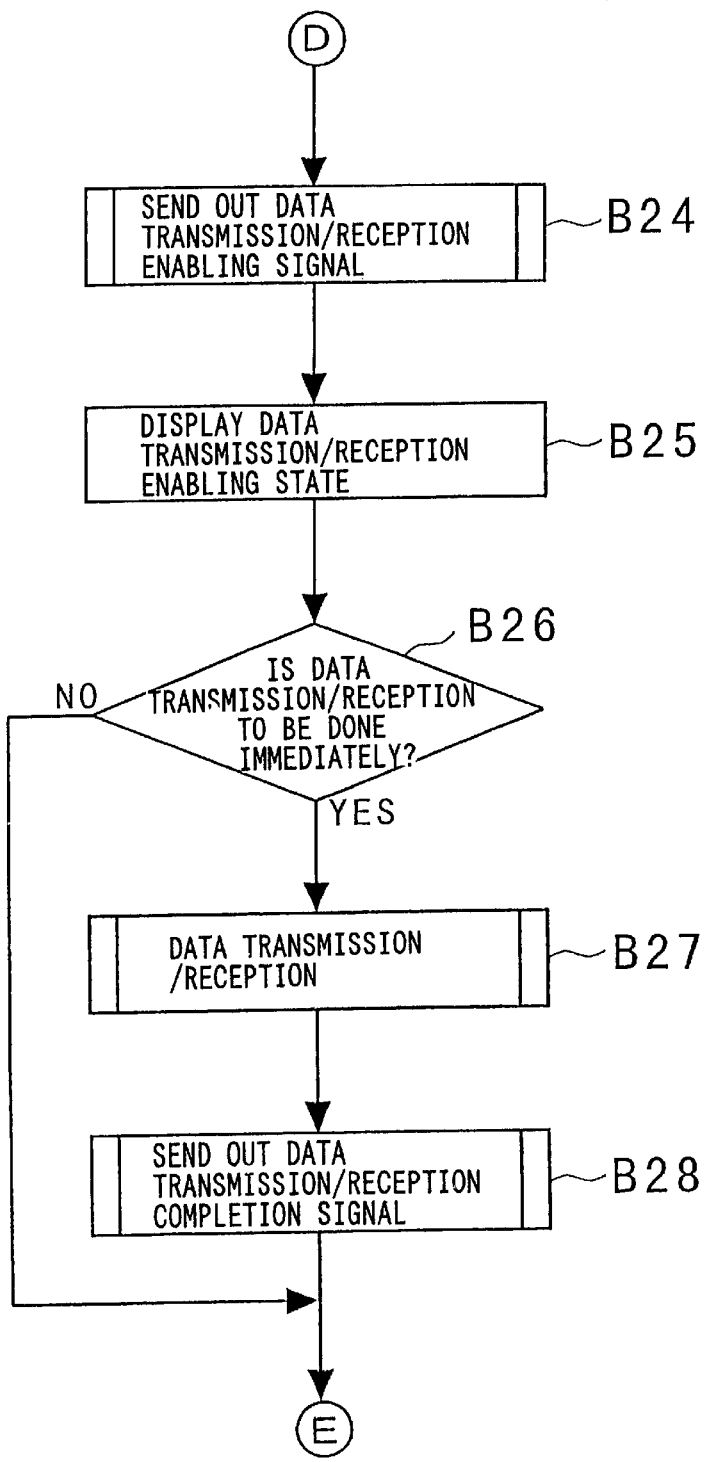
FIG. 10, continuing to FIG. 9, is a flow diagram showing the processing flow of a radio portable information terminal of the embodiment of FIG. 8.

Another example of the present invention is hereinafter explained. The present second example of the present invention is similar in structure to the radio portable information terminal shown in FIG. 2. The data transmission/reception enabling detection table also is similar in structure to the data transmission/reception enabling detection table shown in FIG. 4. FIGS. 8 to 10 are flowcharts showing the processing flow of the second example of the present invention. Referring to FIGS. 2, 5, 8 to 10, the operation of the second example of the present invention is explained.

Referring to FIGS. 2, 4 and 7, the power source of the radio portable information terminal 7 is turned on by the actuating unit 18 (step B1 of FIG. 8).

The radio portable information terminal 7 enters. into the awaiting state (step B2 in FIG. 8) and subsequently verifies whether or not data transmission/reception is to be made within the specified time (steps B3, B4 of FIG. 8). If data transmission/reception is not made within the specified time, processing transfers to the data transmission/reception battery/electrical field detection processing of step B11 of FIG. 8.

If, in the decision of step B4 of FIG. 8, data transmission/reception within the specified time is to be made, the designated time is entered from the actuating unit 18 (step B5 of FIG. 8) to display the designated time on the display unit 19 (step B6 of FIG. 8).

The controller 15 formulates the designated time signal to transmit the specified time signal via the modem unit 14, transmission/reception radio unit 12 and the antenna 11 to send out the specified time signal via the base station 6 to the supervising server 5 of the information network center 1.

The controller 15 checks to see whether or not the specified time acceptance completion signal has been received from the modem 14 (step B10 of FIG. 8). If the specified time acceptance completion signal has not been received, the specified time signal is sent up to, for example, three times to the supervising server 5 of the information network center 1 (steps B7 and 88 of FIG. 8) if the specified time signal has been sent out four or more times (YES branch at step B8), to disable specified time data transmission/reception to extinguish the specified time display on the display unit 19 (step B9 in FIG. 8). The controller 15 then transfers to data transmission/reception battery/electrical field detection processing of step B11.

On the other hand, if the specified time acceptance completion signal is received via the base station 6 from the supervising server 5 of the information network center 1 (YES branch at B10 of FIG. 8), the controller 15 proceeds to the data transmission/reception battery/ electrical field detection processing of step B11.

Then, in the data transmission/reception battery/electrical field detection processing of step B11, the controller 15 captures the state of the battery unit 16 detected in the battery state detection unit 17, and compares the current battery capacity level to the data transmission/reception enabling detection table (see FIG. 5) to verify whether or not the battery level is '4' or more (step B12 of FIG. 9). If the battery level is '4' or more, the controller 15 proceeds to the receiving electrical field detection processing of step B19 of FIG. 9.

If the battery level is less than '4' at step B12 of FIG. 9, the controller 15 formulates data transmission/reception impossible signal data to transmit the data transmission/reception impossible signal from the modem unit 14, transmission/reception radio unit 12 and the antenna 11 to send out the transmission/reception impossible signal via the base station 6 to the supervising server 5 of the information network center 1 (step B13 of FIG. 9) and to display the data transmission/reception impossible state on the display unit 19 (step B14).

The controller 15 then proceeds to the charging awaiting state (step B15 of FIG. 9). If the battery is being charged, charging is continued (steps B16 and B17 of FIG. 9). If the battery has been charged such that the battery level is '4' or more (step B18), the controller 15 proceeds to the receiving electrical field detection processing of step B19 of FIG. 9.

The controller 15 collates and compares the current receiving electrical field level, as detected by the receiving electrical field detection unit 13, to the data transmission/reception enabling detection table (see FIG. 5), to verify whether or not the receiving electrical field level is '4' or more (step B19 of FIG. 9).

If the current receiving electrical field level is on the transmission/reception impossible level, the controller 15 formulates transmission/reception impossible signal data to transmit a data transmission/reception impossible signal from the modem unit 14, transmission/reception radio unit 12 and the antenna 11 to send out the data transmission/reception impossible signal via the base station 6 to the supervising server 5 of the information network center 1 (step B20 of FIG. 9) and to display the transmission/reception impossible state in the display unit 19.

If the battery level is '4' or more and the receiving electrical field level is '4' or more, the controller 15 formulates a data transmission/reception possible signal to send out a data transmission possible state signal from the modem unit 14, transmission/reception radio unit 12 and the antenna 11 to send out the data transmission possible state signal via the base station 6 to the supervising server 5 of the information network center 1 (step B24 of FIG. 10) and to display the data transmission possible state on the display unit 19 (step B25 of FIG. 10).

It is further verified whether or not data transmission/reception is to be made immediately (step B26 of FIG. 10). If data transmission/reception is not to made immediately, the controller 15 reverts to the awaiting operation of step B2 and, if data transmission/reception is to be made immediately, data transmission/reception is carried out between the radio portable information terminal 7 and the information network center 1 (step B27 of FIG. 10).

When the data transmission/reception comes to a close, a data transmission/reception completion signal is sent from the radio portable information terminal 7 to the information network center 1 (step B28 of FIG. 10) to revert to the awaiting operation of step B2 of FIG. 8.

FIG. 10 shows the operating sequence of an example of the present invention and specifically the specified time data transmission/reception sequence in case specified time data transmission/reception setting is made between the radio portable information terminal 7 and the information network center 1 and data transmission/reception is made within the specified time.

Referring to FIG. 10, if specified data transmission/reception is to be done in the radio portable information terminal 7, a specified time signal is formulated from the input specified time and sent out via the base station to the information network center 1. If a specified time acceptance completion signal is sent out via the base station to the information network center 1 and the time is the data transmission/reception specified time, the radio portable information terminal 7 detects the battery level and the receiving electrical field level. If these levels are the transmission/reception enabling level, a transmission/reception possible signal is transmitted via the base station to the information network center 1 and the transmission/reception data is transferred between the information network center 1 and the radio portable information terminal 7. After completion of the transmission/reception, a transmission/reception completion signal is sent from the radio portable information terminal 7 to the information network center 1.

FIG. 11 shows the operating sequence of the preferred example of the present invention and specifically shows the specified time data transmission/reception impossible sequence in case data is transmitted/received in the specified time between the radio portable information terminal 7 and the information network center 1 and transmission/reception is not possible.

Referring to FIG. 11, if specified time data transmission/reception is to be made at the radio portable information terminal 7, a specified time signal is formulated from the input specified time and a specified time signal is sent out via the base station to the information network center 1. If a specified time acceptance completion signal is not received from the information network center 1, the specified time signal is re-transmitted up to thrice to the information network center 1. If nevertheless the specified time acceptance completion signal is not received from the information network center 1, the specified time data transmission/reception is verified to be impossible and the battery level/electrical field level is detected for data transmission/reception. If the level is on the transmission/reception enabling level, data transmission/reception is carried out and subsequently a transmission completion signal is transmitted.

The meritorious effects of the invention are summarised hereinbelow.

According to the present invention, as described above, if data is to be transmitted or received between the radio portable information terminal and the information network center, it is possible for a user to send or receive the information between the radio portable information terminal and the information network center without the necessity of confirming the residual battery capacity or the state of intensity of the electrical field, such as antenna mark display, on the display unit of the radio portable information terminal, thus significantly improving operability and convenience.

Also, according to the present invention, in those cases where automatic incoming or PUSH type information distribution of WWW data or mail data from the information network center to the radio portable information terminal is to be done, where the power source of the radio portable information terminal is not turned on, where the battery capacity is short, where the electrical field is short or where the service area is out-of-area, there is little risk of distributing data without the operator comprehending the state of the terminal side. According to the present invention, wasteful data distribution from the information network center, such as re-transmission, can be minimized to evade failure in data reception to improve data transmission/reception.

It should be noted that other objects of the present invention will become apparent in the entire disclosure and that modifications may be done without departing the gist and scope of the present invention as disclosed herein and appended herewith.

Also it should be noted that any combination of the disclosed and/or claimed elements, matters and/or items may fall under the modifications aforementioned.

What is claimed is:

1. A radio data transfer system of a radio portable information terminal
wherein, when the radio portable information terminal effects data transmission/reception via a radio base station with an information network center, the radio portable information terminal detects the current battery capacity level and the receiving electrical field level to compare and verify whether or not said levels are sufficient to permit said data transmission/reception; if the current battery capacity level and the receiving electrical field level are on the transmission/reception enabling level, said radio portable information terminal formulates a data transmission/reception enabling signal to send said data transmission/reception enabling signal via said radio base station to said information network center; and
wherein said information network center checks to see that the radio portable information terminal is in the transmission/reception enabling state to effect data transmission/reception with said radio portable information terminal.

2. The radio data transfer system of a radio portable information terminal according to claim 1
wherein, if the current battery capacity level or the receiving electrical field level are not up to the transmission/reception enabling level, said radio portable information terminal formulates a data transmission/reception impossible signal to send the data transmission/reception impossible signal via said radio base station to said information network center; and
wherein on reception of said data transmission/reception impossible signal, said information network center performs control so as not to effect data transmission/reception with said radio portable information terminal until said radio portable information terminal transmits the data transmission/reception possible signal to establish the data transmission/reception enabling state.

3. A radio portable information terminal for effecting data transmission/reception via a radio base station with an information network center, comprising:
first detection means for detecting the residual capacity of a battery driving said information terminal;
second detection means for detecting a receiving electrical field level;

means for verifying, at the time of data transmission/reception, whether or not the current residual battery capacity and the receiving electrical field level of the terminal as detected by said first and second detection means, respectively, are sufficient to the levels which permit data transmission/reception with said information network center; and means for formulating a data transmission/reception enabling signal if the data transmission/reception is verified to be possible and for transmitting said data transmission/reception possible signal via said radio base station to said information network center.

4. The radio portable information terminal as defined in claim 3 further comprising:

means for performing control for formulating a data transmission/reception impossible signal for transmitting said data transmission/reception impossible signal via said radio base station to said information network center if said residual battery capacity is less than a pre-set value, said control means performing control for displaying the data transmission/reception impossible state on a display unit of the terminal; and means for performing control for detecting the receiving electrical field level by said second detection means if, after charging the battery in case the residual battery capacity is less than a pre-set value, the residual battery capacity is sufficient to the pre-set value, formulating a data transmission/reception possible signal or a data transmission/reception impossible signal depending on whether the current receiving electrical field level is sufficient to or below a pre-set value, and for sending out said data transmission/reception possible signal or a data transmission/reception impossible signal via said radio base station to said information network center.

5. The radio portable information terminal as defined in claim 3 further comprising:

means for formulating a specified time signal from the specified time entered from an actuating unit of said radio portable information terminal in case where specified time data transmission/reception is to be made in said radio portable information terminal, said means transmitting said specified time signal via said radio base station to said information network center;

wherein a specified time acceptance completion signal is received from said information network center via said radio base station; when it is at the data transmission/reception specified time, the residual battery capacity level and the receiving electrical field level of said radio portable information terminal are detected; whereupon if the detected levels is on or above the data transmission/reception enabling level, a data transmission/reception enabling signal is transmitted via said radio base station to said information network center; and wherein transmission/reception data is transferred with the information network center.

6. The radio portable information terminal as defined in claim 3 comprising:

a table having stored therein the correlation between the level of the residual battery capacity and the receiving electrical field level on the one hand and on the other hand possibility/impossibility data of transmission/reception in a tabulated form;

wherein values of the levels of the residual battery capacity and the receiving electrical field level as detected by said first and second detection means are collated to said table to verify the possibility/impossibility data of transmission/reception.

* * * * *